(12) United States Patent
Arima et al.

(10) Patent No.: US 8,491,725 B2
(45) Date of Patent: Jul. 23, 2013

(54) CLEANING METHOD OF COLORING DEVICE OF OPTICAL FIBER, AND COLORING DEVICE OF OPTICAL FIBER

(75) Inventors: Kiyoshi Arima, Tokyo (JP); Hiroaki Itoh, Tokyo (JP); Tatsuya Taniguchi, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 136 days.

(21) Appl. No.: 12/893,668

(22) Filed: Sep. 29, 2010

(65) Prior Publication Data

US 2011/0011956 A1    Jan. 20, 2011

Related U.S. Application Data

(63) Continuation of application No. PCT/JP2010/050183, filed on Jan. 8, 2010.

(30) Foreign Application Priority Data

Mar. 16, 2009 (JP) .................... 2009-063479

(51) Int. Cl.
*B08B 3/04* (2006.01)
(52) U.S. Cl.
USPC ......................... 134/26; 134/22.18
(58) Field of Classification Search
USPC .............. 134/22.18, 26; 118/125, 405, 420, 118/429, DIG. 18
See application file for complete search history.

(56) References Cited

U.S. PATENT DOCUMENTS

| 6,030,658 A | 2/2000 | Tsuchiya et al. |
| 6,284,046 B1 * | 9/2001 | Orita et al. .................... 118/405 |

FOREIGN PATENT DOCUMENTS

| JP | 06-122535 | | 5/1994 |
| JP | 09-132437 | | 5/1997 |
| JP | 10-226540 | | 8/1998 |
| JP | 11-100236 | | 4/1999 |
| JP | 11100236 A | * | 4/1999 |
| JP | 11139848 A | * | 5/1999 |
| JP | 11-160587 | | 6/1999 |
| JP | 11199236 A | * | 7/1999 |

OTHER PUBLICATIONS

Machine translation of JP11-100236A to Koaizawa.*
Machine translation of JP11-139848A to Shinohara.*
International Search Report issued Mar. 16, 2009 in PCT/JP2010/050183 filed on Jan. 8, 2010.
International Written Opinion issued Mar. 16, 2009 in PCT/JP2010/050183 and filed on Jan. 8, 2010.

* cited by examiner

*Primary Examiner* — Michael Kornakov
*Assistant Examiner* — Douglas Lee
(74) *Attorney, Agent, or Firm* — Oblon, Spivak, McClelland, Maier & Neustadt, L.L.P.

(57) ABSTRACT

A cleaning method comprises first cleaning which includes supplying a cleaning-liquid to the coloring device from the optical fiber passing hole of the nipple and the ink supply opening, and discharging the cleaning-liquid from the cleaning-liquid discharge opening, and second cleaning which includes supplying a cleaning-liquid to the coloring device from the optical fiber passing hole of the nipple and the ink supply opening, and discharging the cleaning-liquid from the optical fiber passing hole of the second die.

9 Claims, 4 Drawing Sheets

CLEANING METHOD OF COLORING DEVICE OF OPTICAL FIBER, AND COLORING DEVICE OF OPTICAL FIBER

CROSS-REFERENCE TO RELATED APPLICATIONS

This application is a continuation of PCT International Application No. PCT/JP2010/050183 filed on Jan. 8, 2010 which claims the benefit of priority from Japanese Patent Application No. 2009-063479 filed on Mar. 16, 2009, the entire contents of which are incorporated herein by reference.

BACKGROUND OF THE INVENTION

1. Field of the Invention

The present invention relates to a cleaning method of coloring device of optical fiber, and a coloring device of optical fiber.

2. Description of the Related Art

A resin coating of an optical fiber is colored in different colors among optical fibers to identify each of the optical fibers. Coloring of optical fibers is performed by passing them through a coloring device. Generally, optical fibers are colored by using one coloring device, even though they are supposed to be coated in different colors. After a certain optical fiber is coated with a certain color, the coloring device is cleaned to wash out the ink, the ink of another color is supplied to the device, and another optical fiber is colored. By cleaning the coloring device like this, mixing of inks of different colors is prevented, thereby achieving a coating of a desired color.

Meanwhile, there has been disclosed a resin coating device that forms a high-quality resin coating in a state of having a drawing speed set high in a process of forming a resin coating on an optical fiber. The resin coating device includes a nipple, a first die, and a second die to sequentially pass optical fibers therethrough. A resin pool is formed at an external periphery of the nipple, and resin path is formed between the nipple and the first and the second dies. An optical fiber passing hole of the second die has a tapered part having an internal diameter of the hole reduced toward a passing direction of the optical fiber. According to this resin coating device, when a resin is supplied to the resin pool from outside, the resin is supplied to an external periphery of an optical fiber through the resin path and is coated onto the optical fiber. In this case, because the optical fiber passing hole of the second die has the tapered part, the resin can be coated stably. Such a structure of the resin coating device is also considered to be effective in performing high-quality coloring in a state where a passage speed of the optical fiber is set high in the coloring device.

SUMMARY OF THE INVENTION

A cleaning method of a coloring device of an optical fiber according to one aspect of the present invention, the coloring device having a nipple, a first die, and a second die through which the optical fiber is sequentially passed, and a frame having an ink pool formed between an external periphery of the nipple and the frame while having an ink supply opening and a cleaning-liquid discharge opening linked to the ink pool, an ink flow path being formed among the nipple and the first and the second dies, and the optical fiber passing hole of the second die having a tapered part of which internal diameter reduces toward a passing direction of the optical fiber, the cleaning method includes: first cleaning which includes supplying a cleaning-liquid to the coloring device from the optical fiber passing hole of the nipple and the ink supply opening, and discharging the cleaning-liquid from the cleaning-liquid discharge opening; and second cleaning which includes supplying a cleaning-liquid to the coloring device from the optical fiber passing hole of the nipple and the ink supply opening, and discharging the cleaning-liquid from the optical fiber passing hole of the second die.

A coloring device of an optical fiber according to another aspect of the present invention includes: a nipple having a first optical fiber passing hole that passes the optical fiber therethrough; a first die positioned underneath the nipple and having a second optical fiber passing hole communicating (connecting) with the first optical fiber passing hole and a plurality of notches at an external periphery; a second die positioned underneath the first die and having a third optical fiber passing hole having a tapered part communicating (connecting) with the second optical fiber passing hole and having an internal diameter of the tapered part reduced toward a passing direction of the optical fiber; and a frame that forms an ink pool between an external periphery of the nipple and the frame and has an ink supply opening and a cleaning-liquid discharge opening linked to the ink pool, wherein ink flow paths are formed among the nipple and the first and the second dies, and a communication (connection) hole structure is formed to sequentially communicate (connect) with the ink pool, the ink flow path, and the tapered-part inside by the plurality of notches of the first die.

The above and other features, advantages, and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a cleaning method of a coloring device of an optical fiber and a coloring device of an optical fiber according to the present invention will be explained below in detail with reference to the accompanying drawings. The present invention is not limited to the embodiments.

Figure 1:
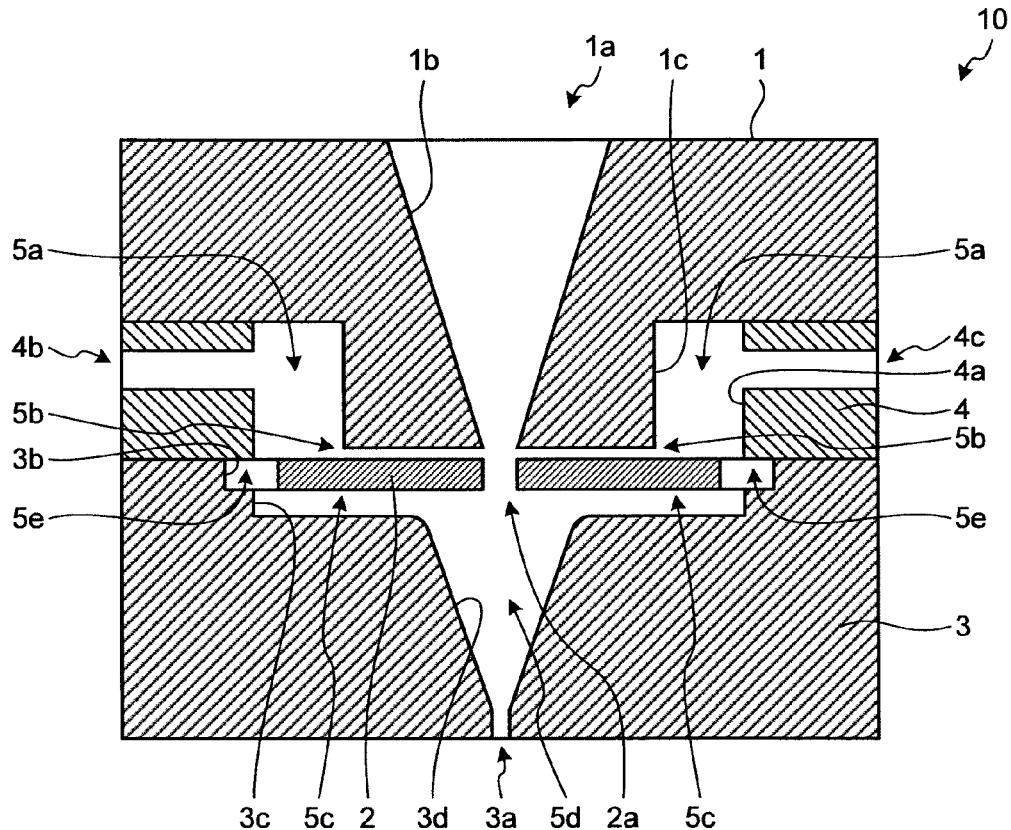
FIG. 1 is a schematic cross-sectional view of a coloring device of an optical fiber according to a first embodiment of the present invention.
Figure 2:
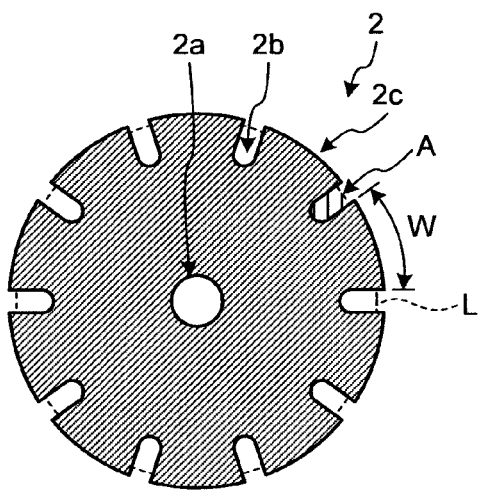
FIG. 2 is a schematic plan view of a first die shown in FIG. 1.

FIG. 1 is a schematic cross-sectional view of a coloring device of an optical fiber according to a first embodiment of the present invention. A coloring device 10 includes a nipple 1, a first die 2, a second die 3, and a frame 4. FIG. 2 is a schematic plan view of the first die 2 shown in FIG. 1. The coloring device 10 is explained below with reference to FIGS. 1 and 2.

The nipple 1 has an optical fiber passing hole 1a through which an optical fiber is passed. The optical fiber passing hole 1a has a tapered part 1b of which internal diameter reduces toward a passing direction of an optical fiber.

The first die 2 is positioned under the nipple 1, and has a disk shape held by being sandwiched between the frame 4 and the second die 3. The first die 2 has an optical fiber passing hole 2a communicating with the optical fiber passing hole 1a. The first die 2 has plural notches 2b at an external periphery thereof, thus forming projections 2c while forming a gear shape. A region outside a broken line L is sandwiched between the frame 4 and the second die 3. A maximum width W of each of the projections 2c in a circumferential direction is preferably equal to or less than 3 millimeters, for example. When the width W is equal to or smaller than 3 millimeters, little ink remains after cleaning in a region sandwiched between the frame 4 of the projections 2c of the first die 2 and the second die 3, and a sufficient cleaning performance can be secured.

An area of a region A inside the broken line L that excludes a region sandwiched between the frame 4 and the second die 3 out of each of the notches 2b, that is, an area S of the region A of a communication (connection) hole structure 5e which will be described later on, is preferably equal to or smaller than 1.0 times an area of the optical fiber passing hole 2a, for example. In a second cleaning process, which will be described later on, a cleaning-liquid flows to a tapered part 3d through the optical fiber passing hole 2a of the first die 2 and the communication (connection) hole structure 5e. When the area S per one communication (connection) hole structure 5e exceeds a certain predetermined size, an ink remaining in the tapered part 3d flows backward to an ink pool 5a, which will be described later on, together with the cleaning-liquid, to pollute the cleaning-liquid in the ink pool 5a, thereby decreasing the cleaning effect.

The second die 3 is positioned under the first die 2, and has an optical fiber passing hole 3a communicating with the optical fiber passing hole 2a. The optical fiber passing hole 3a has a first internal-diameter part 3b, a second internal-diameter part 3c, and the tapered part 3d of which internal diameter reduces toward a passing direction of an optical fiber. The first die 2 is held within the first internal-diameter part 3b of the second die 3.

The frame 4 is positioned between the nipple 1 and the first die 2 and the second die 3, and has approximately a cylindrical shape. The ink pool 5a is formed at an external periphery of the nipple 1 by an internal wall 4a of the frame 4 and an external peripheral wall 1c of the nipple 1. The frame 4 has an ink supply opening 4b and a cleaning-liquid discharge opening 4c formed to be linked to the ink pool 5a.

The frame 4 has an ink flow path 5b formed by arranging a gap between the nipple 1 and the first die 2. An ink flow path 5c is formed between the first die 2 and the second die 3 in the inside of the second internal-diameter part 3c. The communication (connection) hole structure 5e is formed to sequentially communicate with the ink pool 5a, the ink flow path 5c, and a tapered-part inside 5d. The communication (connection) hole structure 5e is provided with holes formed by the first internal-diameter part 3b of the second die 3 and the notches 2b of the first die 2.

An example of a usage method of the coloring device 10 is explained next. First, an ink of a desired color is supplied from the ink supply opening 4b to the coloring device 10. At this time, a flow path connected to the outside of the cleaning-liquid discharge opening 4c is blocked in advance, thereby preventing the ink from flowing outside the coloring device 10 from the cleaning-liquid discharge opening 4c.

Next, a resin-coated optical fiber is sequentially passed through the optical fiber passing holes 1a to 3a of the nipple 1, the first die 2, the second die 3, respectively at a high speed of 1,500 m/minute or more, for example, while an ink is being supplied, whereby the optical fiber is colored. The viscosity of the ink used in this case is preferably equal to or less than 3 Pa·s within the coloring device 10, considering coating properties of the ink onto the optical fiber. In the present usage method, the temperature of ink is a room temperature, and the ink can be heated to adjust the viscosity of the ink.

Figure 3:
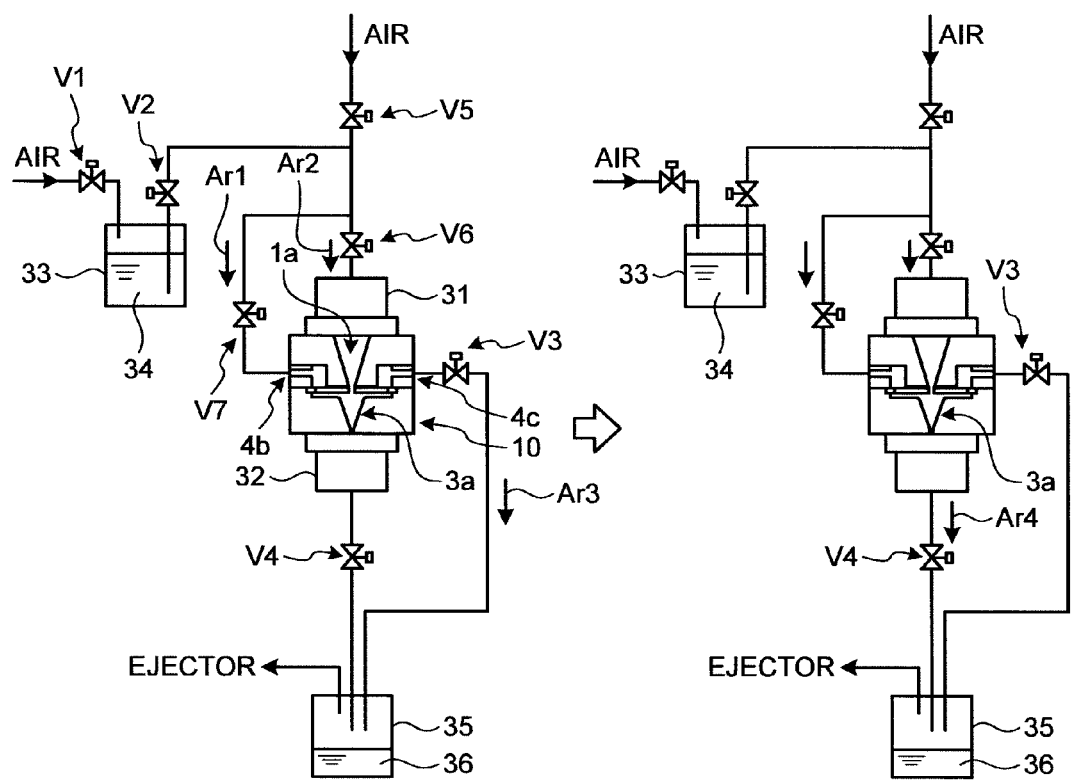
FIG. 3 is an explanatory diagram of a cleaning method of the coloring device shown in FIG. 1.
Figure 4:
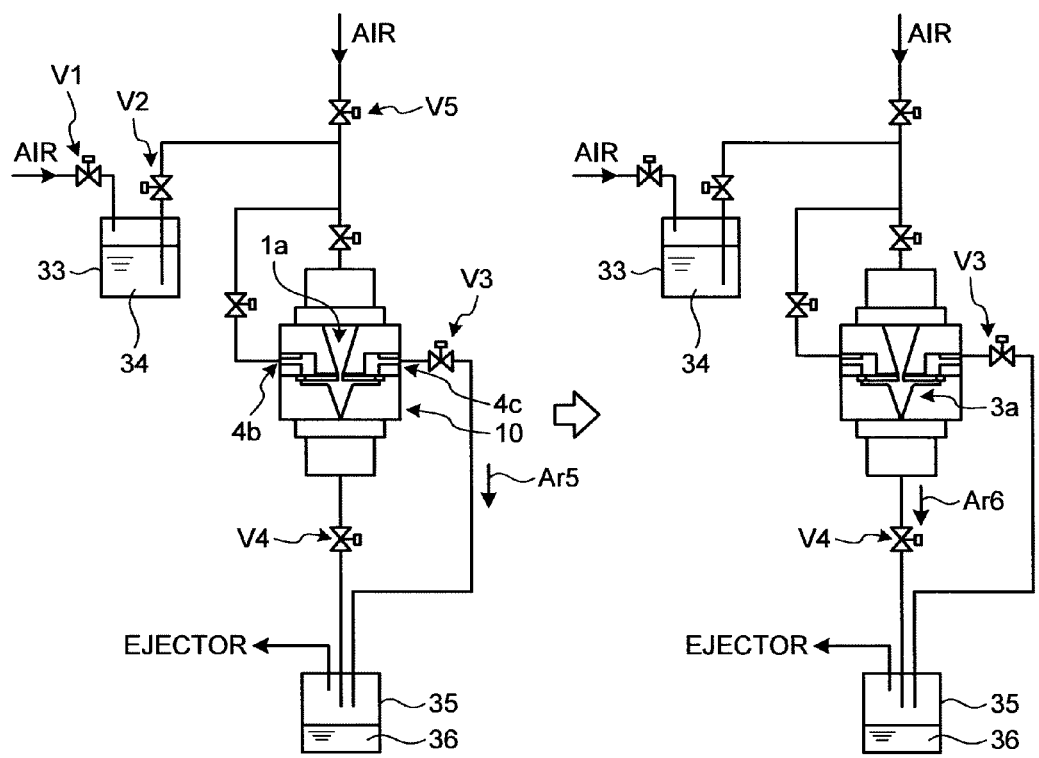
FIG. 4 is an explanatory diagram of a cleaning method of the coloring device shown in FIG. 1.

After finishing coloring the optical fiber in this way, the coloring device 10 is cleaned in the following process. FIGS. 3 and 4 are explanatory views of the cleaning method of the coloring device 10 shown in FIG. 1. FIG. 3 depicts first and second cleaning processes, and FIG. 4 depicts first and second cleaning-liquid discharge processes. In FIGS. 3 and 4, a solid line connected to each valve denotes a piping arrangement. Reference numerals 31 and 32 denote connection jigs that connect a pipe to the optical fiber passing hole 1a or the optical fiber passing hole 3a.

First, as shown in FIG. 3, in the first cleaning process, a cleaning-liquid 34 is stored in a tank 33. Valves V2, V3, V6, and V7 are opened while air is supplied to the tank 33 by opening a valve V1, and the cleaning-liquid 34 is supplied to the coloring device 10 from the ink supply opening 4b and the optical fiber passing hole 1a. Arrows Ar1 and Ar2 indicate flows of the cleaning-liquid 34. A valve V4 connected to the optical fiber passing hole 3a is kept closed. With this arrangement, the inside of the coloring device 10, the ink pool 5a (see FIG. 1) in particular, is cleaned. The cleaning-liquid 34 is discharged from the cleaning-liquid discharge opening 4c, flows through a pipe as indicated by an arrow Ar3, and is stored as a waste liquid 36 in a tank 35 as being decompressed by an ejector.

An organic solvent such as ethylalcohol, acetone, and MEK (methylethylketon) is generally used for the cleaning-liquid of the ink. Among them, ethylalcohol is preferable from a viewpoint of toxicity, handling, and economics. In the first embodiment, ethylalcohol of a relatively low solubility is used for the cleaning-liquid 34, thereby obtaining the cleaning effect. Needless to mention, a higher cleaning effect is obtained when a solvent such as acetone or MEK, which has a higher solubility, is used for the cleaning-liquid 34.

In the coloring device 10 shown in FIG. 1, an angle formed by the ink supply opening 4b and the cleaning-liquid discharge opening 4c around the optical fiber passing holes 1a to 3a is 180 degrees. It is preferred that this angle is between 120 degrees and 180 degrees at which the cleaning-liquid 34 flows satisfactorily and can perform cleaning in a short time.

Next, in the second cleaning process, the valve V3 is closed while the valve V4 is opened. The cleaning-liquid 34 is then discharged from the optical fiber passing hole 3a, flows through a pipe as indicated by an arrow Ar4, and is stored as the waste liquid 36 in the tank 35. In the coloring device 10, the ink pool 5a is isolated from the tapered-part inside 5d (see FIG. 1). Therefore, when only the first cleaning process is performed, the ink tends to remain in the tapered-part inside 5d, and it takes time for the cleaning. Accordingly, in the second cleaning process, it is arranged that the cleaning-liquid 34 will not be discharged from the cleaning-liquid discharge opening 4c by closing the valve V3, but the cleaning-liquid 34 will be discharged from the optical fiber passing hole 3a by opening the valve V4, thereby sufficiently cleaning particularly the tapered-part inside 5d in a short time.

By cleaning particularly the ink pool 5a in the first cleaning process in this way, the cleaning efficiency of the tapered-part inside 5d is further improved in the subsequent second cleaning process because the cleaning-liquid 34 passing through the ink pool 5a is in a clean state without inks being mixed. In the second cleaning process, a flow rate of the cleaning-liquid 34 flowing through the tapered-part inside 5d can be increased by not discharging the cleaning-liquid 34 from the cleaning-liquid discharge opening 4c, which is preferable. In the first cleaning process and the second cleaning process, the coloring device 10 can be heated because cleaning properties can be improved when the viscosity of the ink reduces. In this case, the temperature of the coloring device 10 is preferably equal to or less than a boiling point of the cleaning-liquid 34 so as to avoid boiling of the cleaning-liquid 34.

Next, as shown in FIG. 4, in the first cleaning-liquid discharge process, supply of the cleaning-liquid 34 is stopped by closing the valves V1 and V2. Air is supplied to the coloring device 10 from the ink supply opening 4b and the optical fiber passing hole 1a by opening the valve V5. On the other hand, the valve V3 is opened, while the valve V4 is closed. As a result, the cleaning-liquid 34 is discharged from the inside of the coloring device 10, particularly from the inside of the ink pool 5a. The cleaning-liquid 34 is discharged from the cleaning-liquid discharge opening 4c, flows through a pipe as indicated by an arrow Ar5, and is stored as the waste liquid 36 in the tank 35.

Next, in the second cleaning-liquid discharge process, the valve V3 is closed, while the valve V4 is opened. The cleaning-liquid 34 is then discharged from the optical fiber passing hole 3a, flows through a pipe as indicated by an arrow Ar6, and is stored as the waste liquid 36 in the tank 35. As a result, the cleaning-liquid 34 particularly within the tapered-part inside 5d can be sufficiently discharged. In the first cleaning-liquid discharge process and the second cleaning-liquid discharge process, a sufficient pressure of the air supplied to discharge the cleaning-liquid 34 from the coloring device 10 is equal to or greater than 0.2 megapascal at a gauge pressure. Heated air can be supplied for quick drying of the cleaning-liquid 34.

As explained above, the cleaning-liquid 34 particularly within the ink pool 5a is discharged in the first cleaning-liquid discharge process, and the cleaning-liquid 34 particularly within the tapered-part inside 5d is discharged in the second cleaning-liquid discharge process, whereby the cleaning-liquid 34 can be discharged efficiently. For example, when the cleaning-liquid 34 is attempted to be discharged simultaneously from the cleaning-liquid discharge opening 4c and the optical fiber passing hole 3a by simultaneously opening the valve V3 and the valve V4, an air pressure becomes low in the ink pool 5a, and the cleaning-liquid cannot be sufficiently discharged from the tapered-part inside 5d, or it takes time for the discharge.

While each of the first and second cleaning processes and the first and second cleaning-liquid discharge processes can be performed once, the coloring device 10 can be cleaned more sufficiently by performing each sequence of the first cleaning process to the second cleaning-liquid discharge process for plural times, such repeating the sequence three times, for example.

After the last second cleaning-liquid discharge process is finished, the valves V3 to V5 are closed, thereby completing the cleaning of the coloring device 10. The coloring process described above is performed for the next coloring by changing the ink color.

According to the cleaning method described above, the coloring device 10 can be cleaned quickly, a cleaning time can be shortened, and the amount of a cleaning-liquid used can be reduced substantially. Because this cleaning process is performed each time when a color coated onto an optical fiber is changed, there is a huge effect in time reduction in the processing and reduction in the amount of cleaning-liquid used. Therefore, according to the cleaning method described above, the productivity of the optical fiber can be improved and manufacturing costs can be reduced substantially.

Meanwhile, in the coloring device 10, as shown in FIGS. 1 and 2, the first die 2 has the notches 2b, and there is the communication (connection) hole structure 5e that sequentially passes through the ink pool 5a, the ink flow path 5c, and the tapered-part inside 5d established, by the holes formed by the first internal-diameter part 3b of the second die 3 and the notches 2b of the second die 2. in the case where the communication (connection) hole structure 5e is achieved in this way, the cleaning-liquid 34 flows in the communication (connection) hole structure 5e, and the cleaning-liquid 34 flows along wall surfaces of the first internal-diameter part 3b and the second internal-diameter part 3c of the second die 3 in a direction from the ink pool 5a toward the tapered-part inside 5d, in each of the above processes, particularly in the second cleaning process and the second cleaning-liquid discharge process. Therefore, the flow of the cleaning-liquid 34 will not be stagnant at a corner near a junction of the first die 2 and the second die 3. As a result, the ink at this corner can also be washed out quickly, whereby achieving the cleaning in an even shorter time can be achieved.

Next, as an example of the present invention, the sequence of the above-described processes from the first cleaning process to second cleaning-liquid discharge process were performed on the coloring device in the configuration shown in FIG. 1. As a result, sufficient cleaning was performed in about three minutes. On the other hand, for comparison, the following cleaning process was performed on a coloring device in a configuration having no cleaning-liquid discharge opening in the coloring device shown in FIG. 1. That is, first, a cleaning process was performed such that a cleaning-liquid was supplied from an optical fiber passing hole of a nipple and an ink supply opening, and the cleaning-liquid was discharged from an optical fiber passing hole of a second die. Next, a cleaning-liquid discharge process was performed such that air was supplied from the optical fiber passing hole of the nipple and the ink supply opening, and the cleaning-liquid was discharged from the optical fiber passing hole of the second die. In this case, it took more than ten minutes to have sufficient cleaning completed.

Figure 5:
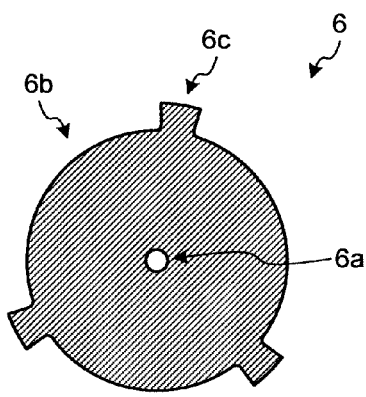
FIG. 5 is a schematic plan view of a first die according to another embodiment that can be used in the coloring device shown in FIG. 1.

FIG. 5 is a schematic plan view of a first die according to another embodiment that can be used in the coloring device 10 shown in FIG. 1. As shown in FIG. 5, a first die 6 has an optical fiber passing hole 6a, and three notches 6b. When the number of the notches 6b is equal to or less than three, three or more projections 6c are formed and the first die 6 can be held stably, and thus it is preferable.

Figure 6:
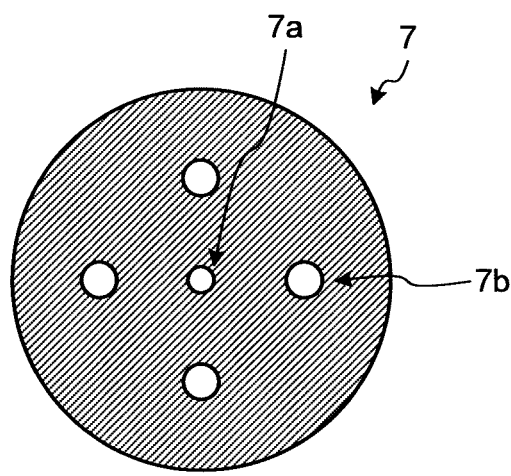
FIG. 6 is a schematic plan view of a first die according to still another embodiment that can be used in the coloring device shown in FIG. 1.

FIG. 6 is a schematic plan view of a first die according to still another embodiment that can be used in the coloring device 10 shown in FIG. 1. As shown in FIG. 6, a first die 7 has an optical fiber passing hole 7a, but the first die 7 is different from the first dies 2 and 6 in that the first die 7 has plural holes 7b being formed. In the case where the first die 7 is used, the communication (connection) hole structure 5e sequentially communicating with the ink pool 5a, the ink flow path 5c, and the tapered-part inside 5d is achieved by plural holes 7b. It is clear that the cleaning method of the coloring device 10 described above is also effective when the first die 7 in this form is used.

Further, although the coloring device 10 shown in FIG. 1 has one ink supply opening 4b and one cleaning-liquid discharge opening 4c, the number of the ink supply openings and that of the cleaning-liquid discharge openings are not particularly limited and thus can come in plural.

According to the above-described embodiment, the coloring device of an optical fiber can be washed quickly, and therefore the productivity of optical fibers can be improved and manufacturing costs can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cleaning method of a coloring device of an optical fiber, the coloring device having
   a nipple, a first die, and a second die through which the optical fiber is sequentially passed, and
   a frame having an ink pool formed between an external periphery of the nipple and the frame while having an ink supply opening and a cleaning-liquid discharge opening linked to the ink pool, an ink flow path being formed among the nipple and the first and the second dies, and an optical fiber passing hole of the second die having a tapered part with an internal diameter that reduces toward a passing direction of the optical fiber, the cleaning method comprising:
   a first cleaning which includes
      supplying a first cleaning-liquid to the coloring device through an optical fiber passing hole of the nipple and through the ink supply opening, and
      flowing a portion of the first cleaning-liquid out of the coloring device through the cleaning-liquid discharge opening while blocking a flow of the first cleaning-liquid out of the coloring device through the optical fiber passing hole of the second die; and
   a second cleaning which includes
      supplying a second cleaning-liquid to the coloring device through the optical fiber passing hole of the nipple and through the ink supply opening, and
      flowing a portion of the second cleaning-liquid out of the coloring device through the optical fiber passing hole of the second die.

2. The cleaning method according to claim 1, wherein the first die has a plurality of notches at an external periphery, and
   the cleaning-liquid is passed through a communication hole structure formed by the notches of the first die in the first and second cleanings.

3. The cleaning method according to claim 2, wherein the number of notches of the first die is equal to or greater than three.

4. The cleaning method according to claim 1, further comprising:
   a first discharging of a residual cleaning-liquid which includes supplying a first pressurized air to the coloring device through the optical fiber passing hole of the nipple and through the ink supply opening, and discharging a first portion of residual cleaning-liquid from the cleaning-liquid discharge opening; and
   a second discharging of the residual cleaning-liquid which includes supplying a second pressurized air to the coloring device through the optical fiber passing hole of the nipple and through the ink supply opening, and discharging a second portion of residual cleaning-liquid from the optical fiber passing hole of the second die,
   wherein the first discharging and the second discharging are performed after the first cleaning and the second cleaning.

5. The cleaning method according to claim 4, wherein the first die has a plurality of notches at an external periphery, and
   the cleaning-liquid is passed through a communication hole structure formed by the notches of the first die in the first and second cleanings.

6. The cleaning method according to claim 5, wherein a number of the plurality of notches of the first die is equal to or greater than three.

7. The method according to claim 4, wherein the first discharging includes blocking a flow of the residual cleaning-liquid out of the coloring device through the optical fiber passing hole of the second die.

8. The method according to claim 4, wherein the second discharging includes blocking a flow of the residual cleaning-liquid out of the coloring device through the cleaning liquid discharge opening.

9. The method according to claim 1, wherein the second cleaning further includes blocking a flow of the second cleaning-liquid out of the coloring device through the cleaning liquid discharge opening.

* * * * *